United States Patent
Bettink et al.

(10) Patent No.: US 8,077,611 B2
(45) Date of Patent: Dec. 13, 2011

(54) MULTILEVEL COUPLED POLICER

(75) Inventors: John H. W. Bettink, San Jose, CA (US); David J. Tsiang, Menlo Park, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 1011 days.

(21) Appl. No.: 11/493,969

(22) Filed: Jul. 27, 2006

(65) Prior Publication Data
US 2008/0025214 A1  Jan. 31, 2008

(51) Int. Cl.
*G01R 31/08* (2006.01)
(52) U.S. Cl. ...................................... 370/230
(58) Field of Classification Search .............. 725/23; 370/229–238.1, 252, 253, 389, 391, 392, 370/396, 395.21, 395.3, 395.4, 395.41–395.43, 370/395.64, 432, 444, 445, 468; 709/207, 709/240; 379/14.01, 114.06, 114.07, 161, 379/208.01; 455/512, 527, 166.2, 177.1, 455/200.1, 266, 452.2
See application file for complete search history.

(56) References Cited

U.S. PATENT DOCUMENTS

| | | | |
|---|---|---|---|
| 4,733,390 A | 3/1988 | Shirakawa et al. | |
| 5,289,517 A | 2/1994 | Ohba et al. | |
| 5,864,557 A | 1/1999 | Lyons | |
| 5,892,766 A | 4/1999 | Wicki et al. | |
| 6,144,662 A | 11/2000 | Colmant et al. | |
| 6,154,829 A | 11/2000 | Mino et al. | |
| 6,438,134 B1 | 8/2002 | Chow et al. | |
| 6,483,839 B1 | 11/2002 | Gemar et al. | |
| 6,625,266 B1 | 9/2003 | Saari et al. | |
| 6,643,293 B1 | 11/2003 | Carr et al. | |
| 7,388,837 B1 * | 6/2008 | St-Denis et al. | 370/235 |
| 7,430,173 B2 * | 9/2008 | St. Denis et al. | 370/235.1 |
| 2001/0033581 A1 | 10/2001 | Kawarai et al. | |
| 2002/0180540 A1 | 12/2002 | Hirai | |
| 2003/0086140 A1 * | 5/2003 | Thomas et al. | 359/167 |
| 2003/0123449 A1 | 7/2003 | Kuhl et al. | |
| 2003/0152084 A1 | 8/2003 | Lee et al. | |
| 2005/0152374 A1 | 7/2005 | Cohen et al. | |
| 2006/0029079 A1 | 2/2006 | Cohen et al. | |

(Continued)

OTHER PUBLICATIONS

"Modular QoS CLI (MQC) Three-Level Hierarchical Policer", Cisco Systems, Inc., San Jose, CA, Oct. 1, 2004.

(Continued)

*Primary Examiner* — Kwang B Yao
*Assistant Examiner* — Tung Q Tran
(74) *Attorney, Agent, or Firm* — The Law Office of Kirk D. Williams (57) ABSTRACT

A multilevel coupled policer is configured to police packets using at least two policing levels, including a first-level of class policers and a second-level aggregate policer. The multilevel coupled policer is configured to share bandwidth of the aggregate policer among packet traffic corresponding to the class policers based on the packet traffic. The multilevel coupled policer is configured to apply a particular class policer corresponding to a particular packet to identify a tentative policing action. The multilevel coupled policer is configured to apply the second-level aggregate policer to the particular packet based on the identified the tentative policing action and a result of a comparison operation of the number of tokens in one or more token buckets associated with the second-level aggregate policer and the length of the particular packet in order to determine a final policing action for marking and/or applying to the particular packet.

12 Claims, 8 Drawing Sheets

U.S. PATENT DOCUMENTS

2006/0029080 A1 2/2006 Kappler et al.
2006/0062144 A1 3/2006 Testa et al.
2006/0133279 A1 6/2006 Le Faucher et al.
2006/0176818 A1* 8/2006 Olsen et al. .................. 370/235
2007/0171824 A1 7/2007 Ruello et al.

OTHER PUBLICATIONS

Shah et al., "Maintaining Statistics Counters in Router Line Cards," IEEE Micro, Jan.-Feb. 2002, pp. 76-81.

Heinanen et al., "A Single Rate Three Color Marker," RFC 2697, IETF, Sep. 1999.

Heinanen et al., "A Two Rate Three Color Marker," RFC 2698, IETF, Sep. 1999.

Ramabhadran, S. and Varghese, G. 2003. Efficient implementation of a statistics counter architecture. In Proceedings of the 2003 ACM Sigmetrics international Conference on Measurement and Modeling of Computer Systems (San Diego, CA, USA, Jun. 11-14, 2003). Sigmetrics '03. ACM Press, New York, NY, 261-271.

* cited by examiner

MULTILEVEL COUPLED POLICER

TECHNICAL FIELD

One embodiment of the invention relates to communications and computer systems, especially routers, packet switching systems, and other devices; and more particularly, one embodiment relates to multilevel coupled policers and their use for policing packet traffic.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Consumers and designers of these systems typically desire high reliability and increased performance at a reasonable price. Also, certain users and applications of communications services demand a guaranteed quality of service. To help in this regard, communications systems may meter or police the amount of traffic allowed into a communications component or across a link. For example, a line card might assign and enforce an average traffic rate while accommodating a limited burstiness in the traffic.

A common approach to implement such a metering scheme is through a policer using one or more token buckets. Tokens are added to a bucket at some fixed rate of X (tokens per second) and are removed from the bucket whenever a packet arrives. A bucket also has a finite depth, as it never contains more than Y tokens. A token might represent the allowance of an entire packet, or might represent some fraction or multiple of a packet (e.g., one byte).

When a packet arrives and the requisite number of tokens are available (e.g., at least one token when a token represents one packet, at least m tokens for an m byte packet when a token represents a byte of information, etc.), the corresponding number of tokens are removed from the bucket and the packet is considered to be conforming (i.e., in profile). If the requisite number of tokens are not in the bucket when the packet arrives, the packet is declared to be non-conforming (i.e., out of profile). The token replenishment rate X represents the long-term average rate limit if packets are to remain conforming. However, packets may arrive in short bursts and still be considered in profile. For example, up to Y tokens may be available in the bucket, and therefore up to Y packets or Y bytes may arrive back to back in time and still get through. Judicious selection of X and Y allows a profile to enforce a desired long-term average packet rate while being tolerant of short bursts of packets arriving faster than X packets or bytes per second, or some variant thereof.

In a typical token bucket implementation, tokens are added to the bucket at the rate X. The step of adding tokens to the bucket is done in response to the arrival of a packet or an expiration of a timer, with the number of tokens added being a function of the current time, the last time tokens were added, and the rate X. In one known implementation, the number of tokens added is calculated by multiplying the rate X by the difference in the time (e.g., current time minus last time, or the interval of the timer). In another known implementation, the number of tokens added is calculated by a division operation of the time interval by the rate, typically to determine a number of elapsed fixed time periods.

Figure 1A:
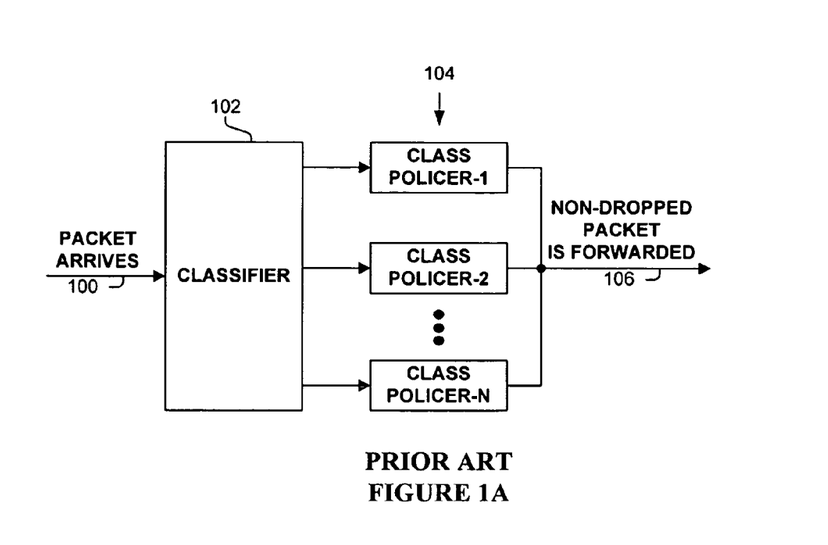
- FIG. 1A is a block diagram of a prior art policer configuration.

FIG. 1A illustrates a conventional mechanism for policing packet traffic. A packet is received (100) and is classified by classifier 102, typically based on some data extracted from the packet and/or metadata associated with the packet. Based on this classification, the packet is forwarded to the appropriate class policer 104, which polices the packet according to its respective policies. Non-dropped packets are forwarded (106).

A problem with such a configuration can occur when the bandwidth of the output link (106) is divided among policers 104, such that the sum of the bandwidth of each policer 104 is equal to the that the bandwidth of output link (106). In such a configuration, the unused bandwidth of a policer 104 cannot be used by another policer 104. The aggregate bandwidth of class policers 104 can be set greater than that of the bandwidth of link (106), but when all policers 104 are operating at full bandwidth, the policing function will not appropriately police traffic to equal that of the bandwidth of output link (106).

Figure 1B:
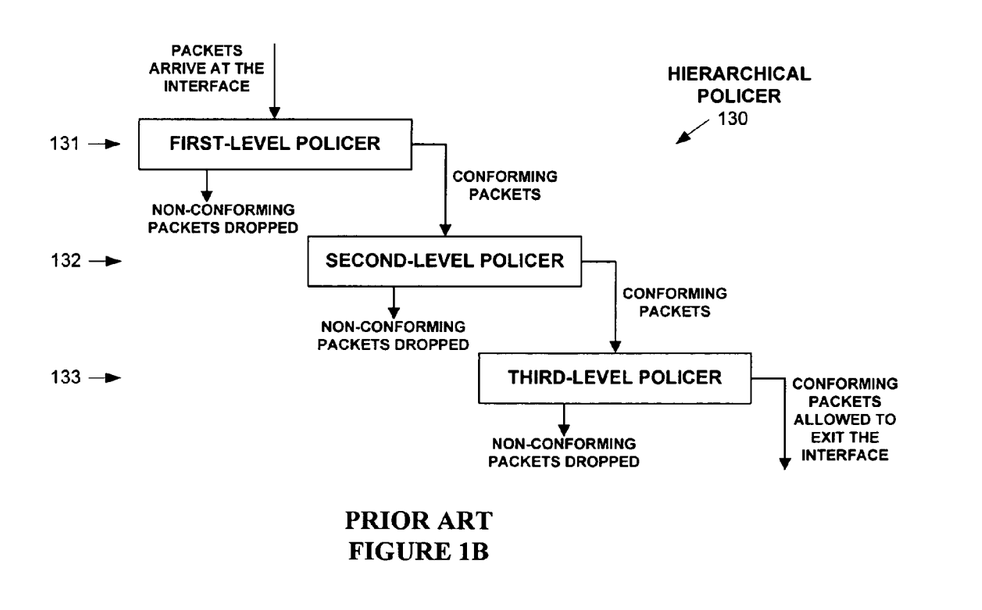
FIG. 1B is a block diagram of a prior art hierarchical policer configuration.

FIG. 1B illustrates a prior art hierarchical policer 130, which consists of three policers or policing stages (131, 132, 133) arranged in a pipeline fashion. If a packet is not dropped by policer 131, it proceeds to policer 132. If the packet is not dropped by policer 132, then it proceeds to policer 133. If it is not dropped by policer 133, it is allowed to continue on. In other words, in order for a packet to pass through hierarchical policer 130, it must be conforming at each of its policing stages (131, 132, 133), otherwise it is immediately dropped by the corresponding policing stage (131, 132, 133).

SUMMARY

Disclosed are, inter alia, methods, apparatus, data structures, computer-readable media, mechanisms, and means for policing traffic using one or more multilevel coupled policers. One embodiment includes a multilevel coupled policer configured to police packets. A first-level plurality of class policers is configured to identify a tentative policing action for each packet. A second-level aggregate policer configured to determine final policing actions for these packets based on their respective tentative policing action and bandwidth allocated to the aggregate policer that is shared among packets from these class policers, which includes allowing packets identified at the class policing level as being non-conforming to possibly be reclassified by the aggregate policer as conforming and allowed to proceed (e.g., not dropped at the class policing level).

In one embodiment, one or more of the first-level class policers is associated with a token bucket filled at a rate corresponding to a minimum bandwidth guarantee, with this token bucket being used to determine said tentative policing actions. In one embodiment, the aggregate policer is associated with an aggregate token bucket filled at a rate not exceeding the sum of the minimum bandwidth guaranteed rates of the class policers, with the aggregate token bucket being used to determine said reclassification of said packets. In one embodiment, one or more of the first-level class policers is associated with a token bucket filled at a rate corresponding to an absolute bandwidth rate, with the token bucket being used to determine said tentative policing actions.

BRIEF DESCRIPTION OF THE DRAWINGS

The appended claims set forth the features of the invention with particularity. The invention, together with its advan

DETAILED DESCRIPTION

Disclosed are, inter alia, methods, apparatus, data structures, computer-readable media, mechanisms, and means for policing traffic using one or more multilevel coupled policers.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, frames, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device broadly refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface), or even a "port" as commonly used in bridging terminology.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism tangibly embodying instructions and/or data. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for policing traffic using one or more multilevel coupled policers.

One embodiment of an apparatus configured to police packets includes: a first-level plurality of class policers configured to identify a tentative policing action for each packet of a plurality of packets; and a second-level aggregate policer configured to determine final policing actions for said packets based on their respective tentative policing action and bandwidth allocated to the aggregate policer to share among said class policers; wherein said determination of the final policing action includes reclassifying one or more packets identified as being non-conforming from said first-level plurality of class policers into a different policing classification, wherein the apparatus is configured to process said one or more reclassified packets according to a conforming action.

In one embodiment, the conforming action includes not dropping said one or more reclassified packets, and allowing said one or more reclassified packets to proceed or be further processed. In one embodiment, said different policing classification is conforming. In one embodiment, one or more of said first-level class policers is associated with a token bucket filled at a rate corresponding to a minimum bandwidth guarantee; and wherein the apparatus is configured to use said token bucket in determining said tentative policing actions. In one embodiment, the aggregate policer is associated with an aggregate token bucket filled at a rate not exceeding the sum of said minimum bandwidth guaranteed rates of said class policers; and wherein the apparatus is configured to use said aggregate token bucket in determining said reclassification of said packets. In one embodiment, said one or more of said first-level class policers are associated with a respective token bucket filled at a rate corresponding to an absolute bandwidth rate; and wherein said apparatus is configured to use said token bucket in determining said tentative policing actions. In one embodiment, said determination of the final policing action includes identifying that certain packets should not be reclassified based on their associated first-level class policer of the plurality of class policers.

One embodiment of a multilevel coupled policer configured to police packets includes: at least two policing levels including a first-level plurality of class policers and a second-level aggregate policer, with the multilevel coupled policer being configured to share bandwidth of the aggregate policer among packet traffic corresponding to the class policers based on said packet traffic; wherein the multilevel coupled policer is configured to apply a particular class policer of the plurality of class policers corresponding to a particular packet to identify a tentative policing action; wherein the multilevel coupled policer is configured to apply the second-level aggregate policer to the particular packet based on said identified tentative policing action and based on a number of tokens in a token bucket associated with the second-level aggregate policer in order to determine a final policing action for marking or applying to the particular packet; wherein the second-level aggregate policer is configured to classify the final policing action as conforming when the tentative policing action was said identified as not being conforming for the particular class policer and the number of tokens in the token bucket corresponded to the particular packet as being conforming with the aggregate policer; and wherein the multilevel coupled policer is configured to mark or apply said identified final policing action to the particular packet.

In one embodiment, the multilevel coupled policer is configured to mark the particular packet for possible dropping or is configured to drop the particular packet in response to the final policing action not being conforming. In one embodiment, the multilevel coupled policer is configured to allow the number of tokens in the token bucket associated with the second-level aggregate policer to be negative.

One embodiment of a multilevel coupled policer configured to police packets, includes: at least two policing levels including a first-level plurality of class policers and a second-level aggregate policer, the multilevel coupled policer configured to share bandwidth of the aggregate policer among packet traffic corresponding to the class policers based on said packet traffic; wherein the multilevel coupled policer is configured to apply a particular class policer of the plurality of class policers corresponding to a particular packet to identify a tentative policing action, the tentative policing action including conforming, violating, and exceeding; wherein the multilevel coupled policer is configured to apply the second-level aggregate policer to the particular packet based on said identified tentative policing action as well as a number of tokens in a committed information rate (CIR) aggregate token bucket or a peak information rate (PIR) aggregate token bucket associated with the second-level aggregate policer in order to determine a final policing action for marking or applying to the particular packet; wherein the second-level aggregate policer is configured to classify the final policing action as conforming when the tentative policing action was said identified as violating or exceeding for the particular class policer and said one or more results of said one or more comparison operations identified the particular packet as being conforming with the second-level aggregate policer; and wherein the multilevel coupled policer is configured to mark or apply said identified final policing action to the particular packet In one embodiment, the multilevel coupled policer is configured to allow the number of tokens in the committed information rate (CIR) aggregate token bucket and the peak information rate (PIR) aggregate token bucket to be negative to account for bandwidth of conforming packets. In one embodiment, said identification of the particular packet as being conforming with the second-level aggregate policer is based on the number of tokens in the committed information rate (CIR) aggregate token bucket being in conformance with the length of the particular packet and the tentative policing action was said identified as exceeding. In one embodiment, said identification of the particular packet as being conforming with the second-level aggregate policer is based on the number of tokens in the peak information rate (PIR) aggregate token bucket being in conformance with the length of the particular packet, the number of tokens in the committed information rate (CIR) aggregate token bucket being in conformance with the length of the particular packet, and the tentative policing action was said identified as violating.

One embodiment polices packets using a multilevel coupled policer scheme including a first-level plurality of class policers and a second-level aggregate policer, with each of said policers associated with a token bucket, the multilevel coupled policer scheme configured to share bandwidth of the aggregate policer among packet traffic corresponding to the class policers based on said packet traffic. One embodiment performs operations including: selecting a particular class token bucket of said class token buckets based on a particular packet; updating the number of tokens in the particular class token bucket based on the elapsed time since its last update and a corresponding token fill rate; updating the number of tokens in an aggregate token bucket associated with the particular token bucket based on the elapsed time since its last update and a corresponding token fill rate; in response to determining that the length of the packet conforms with the number of tokens in the particular class token bucket or in the aggregate token bucket: updating both the particular class token bucket and the aggregate token bucket based on the length of the packet, and marking or applying conforming action to the particular packet; and in response to determining that the length of the packet does not conform with the number of tokens in the particular class token bucket: in response to determining that the length of the packet does not conform with the number of tokens in the aggregate token bucket, marking or applying an exceeding action to the particular packet.

In one embodiment, said exceeding action includes dropping the particular packet. In one embodiment, said conforming action includes forwarding the packet. In one embodiment, said operation of the determination that the length of the packet conforms with the number of tokens in the particular class token bucket or in the aggregate token bucket includes: determining that the number of tokens in the particular class token bucket is not enough for the particular packet to conform, and determining that the number of tokens in the aggregate token bucket is enough for the particular packet to conform. In one embodiment, said operation of in response to determining that the length of the packet conforms with the number of tokens in the particular class token bucket or in the aggregate token bucket: updating both the particular class token bucket and the aggregate token bucket based on the length of the packet, and marking or applying conforming action to the particular packet includes: determining that the number of tokens in the particular class token bucket is sufficient for the particular packet, and updating the aggregate token bucket to result in a negative number of tokens.

One embodiment comprises a multilevel coupled policer configured to police packets, with the multilevel coupled policer including: a first-level plurality of class policers, with each of said policers associated with a committed information rate (CIR) token bucket and a peak information rate (PIR) token bucket; a second-level aggregate policer associated with a CIR aggregate token bucket and a PIR aggregate token bucket; means for updating the number of tokens in a particular CIR class token bucket and in a particular PIR token bucket corresponding to an arrived particular packet based on the elapsed time since their respective last update and based on their respective token fill rate; means for updating the number of tokens in said CIR aggregate token bucket and said PIR aggregate token bucket based on the elapsed time since their respective last update and based on their respective token fill rate; means for updating the number of tokens in the particular PIR class token bucket, in the particular CIR class token bucket, in said CIR aggregate token bucket, and in said PIR aggregate token bucket based on the packet length and for marking or applying conforming action to the particular packet when the length of the packet conforms with the number of tokens in the particular PIR class token bucket and in the particular CIR class token bucket; and means for classifying the packet as conforming, for marking or applying conforming action to the particular packet, and for updating the number of tokens in said CIR aggregate token bucket and said PIR aggregate token bucket based on the length of the packet, when determined to not to be conforming based on the particular PIR class token bucket or the particular CIR class token bucket, but determined to be conforming based on the CIR aggregate token bucket.

One embodiment includes means for identifying the particular packet as violating and for marking or applying violating action to the particular packet when the length of the packet does not conform with the number of tokens in the particular PIR class token bucket nor with the number of tokens in the PIR aggregate token bucket. One embodiment includes means for identifying the particular packet as exceeding and for marking or applying exceeding action to the particular packet when the length of the packet does not conform with the number of tokens in the particular PIR class token bucket, the length of the packet does conform with the number of tokens in the PIR aggregate token bucket, and the length of the packet does not conform with the number of tokens in the CIR aggregate token bucket; and means for updating the number of tokens in said PIR aggregate token bucket based on the length of the packet.

In one embodiment, the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket.

In one embodiment, the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket; and means for updating the number of tokens in said PIR aggregate token bucket based on the length of the packet.

One embodiment includes means for identifying the particular packet as exceeding and for marking or applying exceeding action to the particular packet when the length of the packet does not conform with the number of tokens in the particular PIR class token bucket, the length of the packet does conform with the number of tokens in the PIR aggregate token bucket, and the length of the packet does not conform with the number of tokens in the CIR aggregate token bucket; and means for updating the number of tokens in said PIR aggregate token bucket based on the length of the packet.

In one embodiment, the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket.

In one embodiment, the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket; and wherein the multilevel coupled policer includes: means for updating the number of tokens in said PIR aggregate token bucket based on the length of the packet.

Figure 2A:
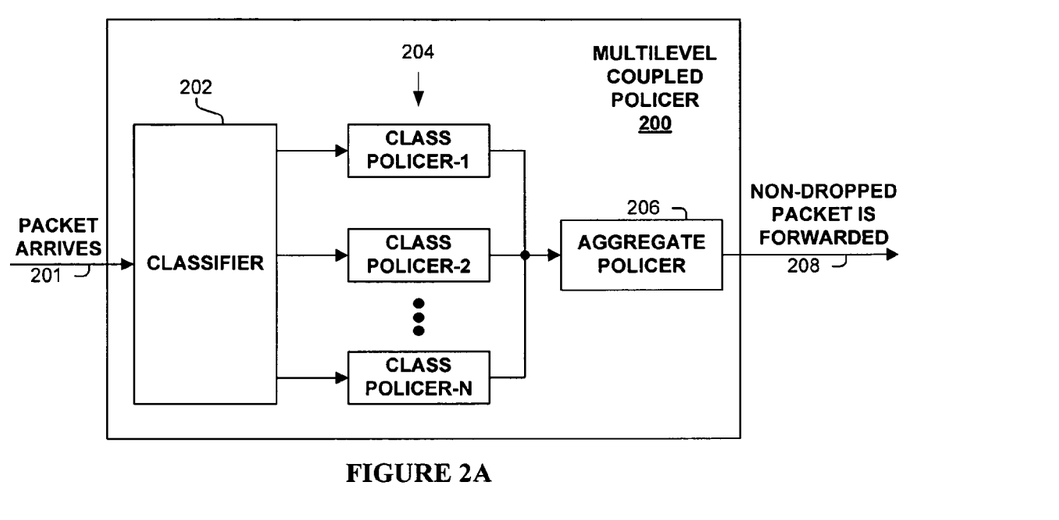
FIGS. 2A-B and 3A-B are block diagrams illustrating some of an extensible number of multilevel coupled policers that can be used in one embodiment.

Turning to the figures, FIG. 2A illustrates a multilevel coupled policer 200 used in one embodiment. As shown, a packet arrives (201) at multilevel coupled policer 200. Classifier 202 identifies which class policer 204 to apply to the arrived packet, typically based on data extracted from the packet and/or metadata associated with the packet. The selected class policer 204 identifies a tentative policing result, using known (e.g., token buckets, etc.) or future developed policing techniques. Aggregate policer 206, based on the tentative policing result and its policing methodology (e.g., token buckets or any other known or future developed policing technique) identifies a policing action for the arrived packets, and non-dropped packets (208) are forwarded from multilevel coupled policer 200.

Figure 2B:
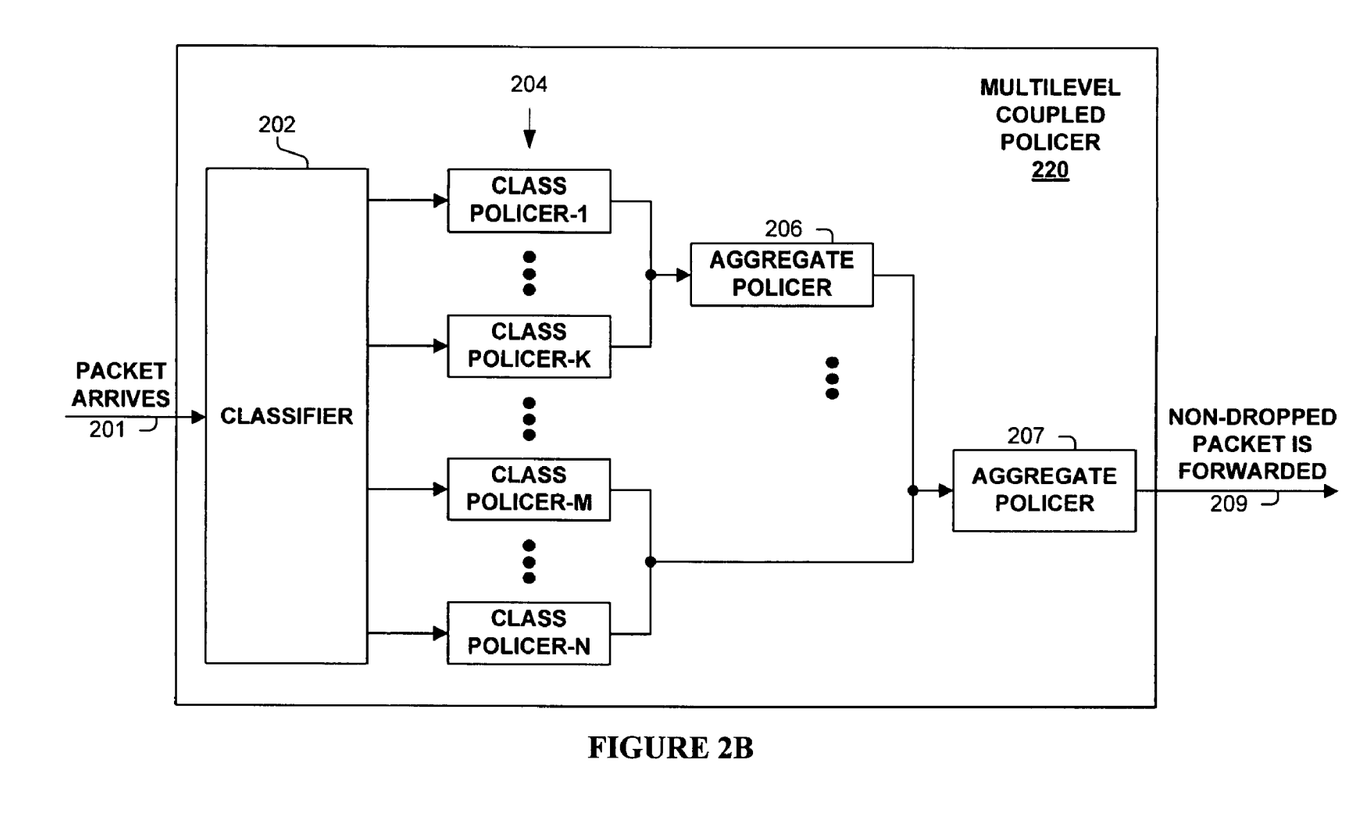

FIG. 2B illustrates a multilevel coupled policer 220, which is a variant of multilevel coupled policer 200 (FIG. 2A), which illustrates that multiple levels of aggregate policers 206-207 can be used in determining the forwarding action for dropped and non-dropped packets (209).

Figure 3A:
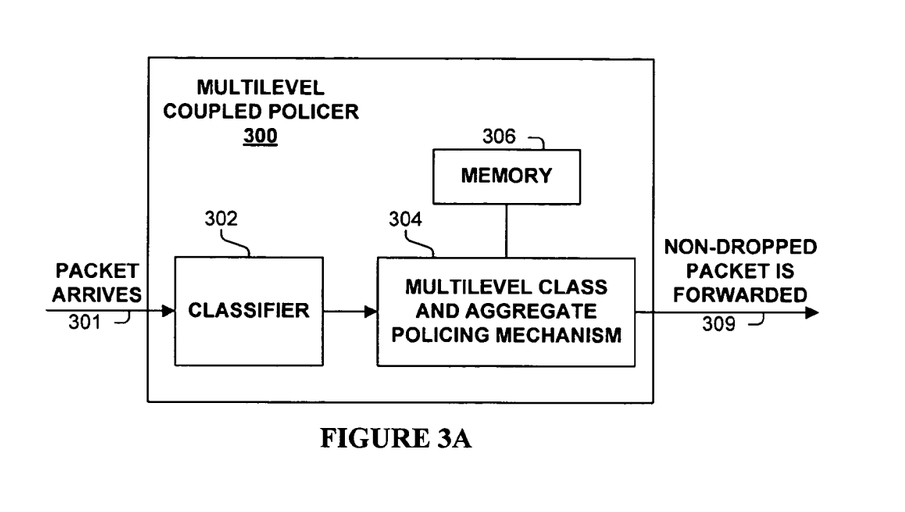

FIG. 3A illustrates a multilevel coupled policer 300 used in one embodiment. Note, FIGS. 2A-B illustrate both a logical configuration of the multi-levels of policers (i.e., how the processing logically flows) and one physical implementation using multiple physical policers. In many instances, a single policing mechanism referencing multiple policing parameters (e.g., token buckets) is used to implement multiple policers.

As shown in FIG. 3A, multilevel coupled policer 300 classifies (302) an arrived packet (301), and retrieves from memory 306 the corresponding policing parameters associated with the first-level class policer and the one or more aggregate policers 304 to be used, and applies these policers to the packet to determine the forwarding action for dropped and non-dropped packets (309).

Figure 3B:
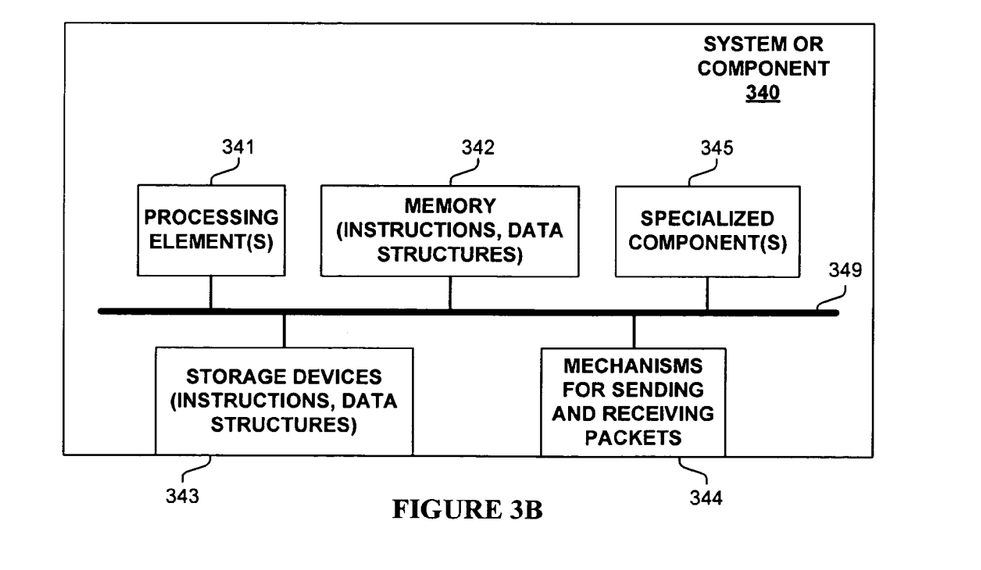

FIG. 3B is block diagram of a system or component 340 used in one embodiment of a multilevel coupled policer. In one embodiment, system or component 340 performs one or more processes corresponding to one of the flow diagrams and/or store one or more of the data structures illustrated or otherwise described herein.

In one embodiment, system or component 340 includes one or more processing elements 341, memory 342, storage devices 343, mechanisms for sending and receiving packets 344, and specialized components 345 (e.g., ternary or binary content-addressable memories used for packet classification, etc.), which are typically communicatively coupled via one or more communications mechanisms 349, with the communications paths typically tailored to meet the needs of the application.

Various embodiments of component 340 may include more or less elements. The operation of component 340 is typically controlled by processing element 341 using memory 342 and storage devices 343 to perform one or more tasks or processes. Memory 342 is one type of computer-readable medium, and typically comprises random access memory (RAM), read only memory (ROM), flash memory, integrated circuits, and/or other memory components. Memory 342 typically stores computer-executable instructions to be executed by processing element 341 and/or data which is manipulated by processing element 341 for implementing functionality in accordance with an embodiment. Storage devices 343 are another type of computer-readable medium, and typically comprise solid state storage media, disk drives, diskettes, networked services, tape drives, and other storage devices. Storage devices 343 typically store computer-executable instructions to be executed by processing element 341 and/or data which is manipulated by processing element 341 for implementing functionality in accordance with an embodiment.

Figure 4A:
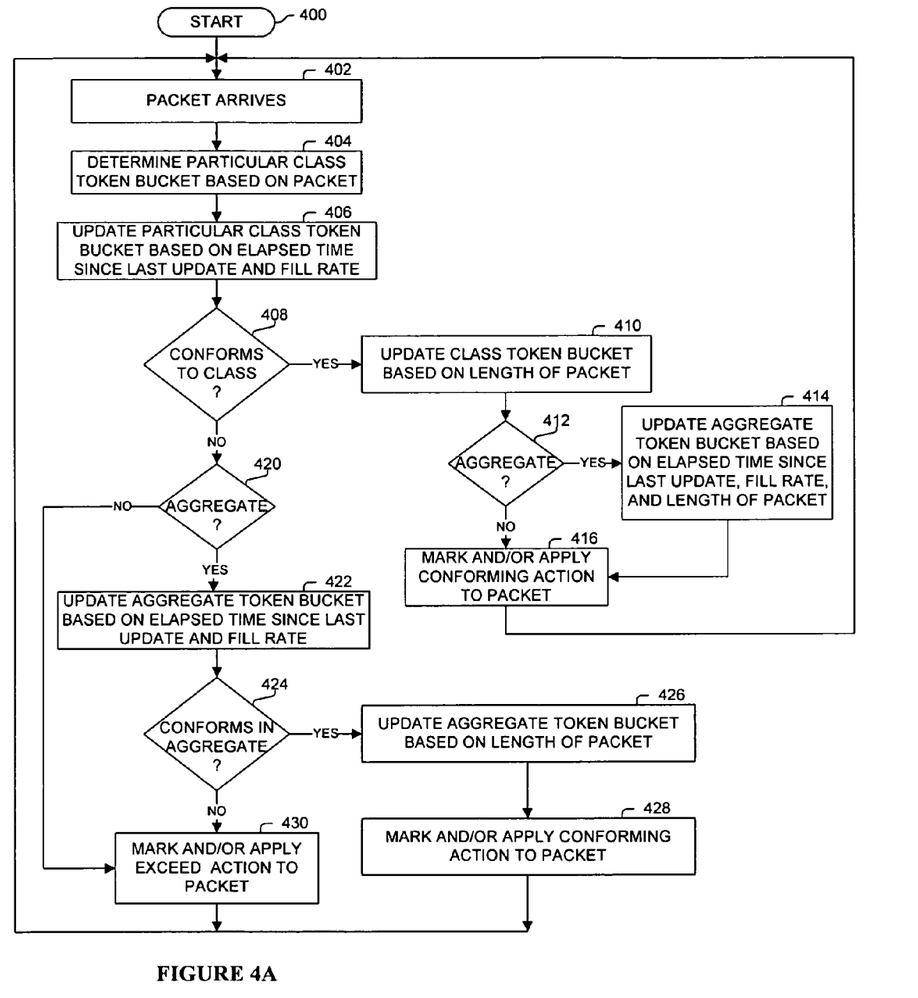
FIG. 4A is flow diagram illustrating a process used in one embodiment using one or more multilevel coupled policers.
Figure 4B:
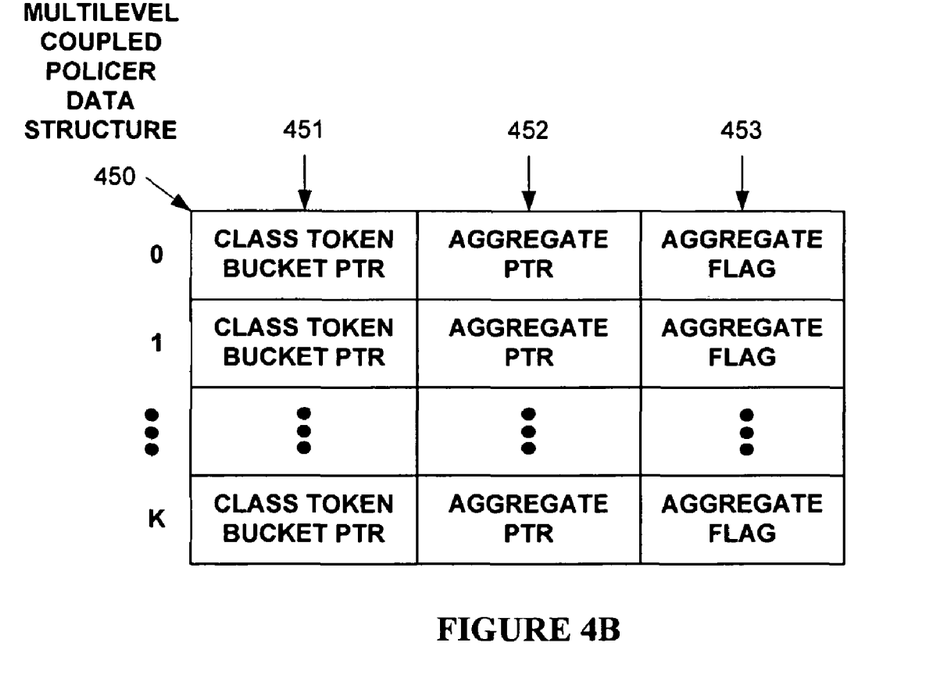
FIG. 4B is a data structure used in one embodiment.

FIG. 4A illustrates a process used in one embodiment using one or more multilevel coupled policers, and FIG. 4B illustrates a data structure 450 used in one embodiment. Multilevel coupled policer data structure 450 includes for each of K classifications, a pointer 451 to a class token bucket (e.g., associated with a first-level class policer), a pointer 452 to an aggregate token bucket (e.g., associated with an aggregate policer), and an aggregate flag 453 to identify whether or not to allow the use of bandwidth of the aggregate policer. Note, one embodiment allows the selective use of the bandwidth of the aggregate policer, while one embodiment does not allow the selective use. The flow diagram of FIG. 4A illustrates the use of such selection of one embodiment; while the flow diagram of FIG. 5A does not illustrate such selection. Of course, one skilled in the art could easily adapt an embodiment to allow or not to allow such selection.

Processing of FIG. 4A begins with process block 400, and proceeds to process block 402, wherein a packet arrives. In process block 404, the particular class token bucket (i.e., the class policer) to use for the packet is identified. In process block 406, the particular class token bucket is updated based on the elapsed time and its fill rate.

As determined in process block 408, if the packet conforms to the class token bucket (e.g., the token bucket has enough tokens for the length/size of the packet, as in one embodiment, the number of tokens is greater than the length of the packet measured in corresponding units), then in process block 410, the class token bucket is updated based on the length of the packet (e.g., the number of tokens in the token bucket is reduced by a number of tokens corresponding to the length of the packet). As determined in process block 412, if use of the bandwidth of the aggregate policer is allowed for the current packet (e.g., the classification thereof), then in process block 414, the aggregate token bucket is updated based on the elapsed time since its last update, its fill rate, and the length of the packet (e.g., the token bucket is increased by the number of token buckets that should be added since its last update, possibly to a maximum number, and is reduced by the number of tokens corresponding to the length of the packet). In process block 416, the packet is marked as conforming and/or the conforming action is applied to the packet; and processing returns to process block 402.

Otherwise, as determined in process block 420, if aggregation is not allowed, then in process block 430, the packet is marked as exceeding and/or the exceeding action is applied to the packet; and processing returns to process block 402. In other words, if aggregations is not allowed, the bandwidth of the aggregate policer (e.g., typically, this includes unused bandwidth of the first-level class policers). Otherwise, in process block 422, the aggregate token bucket is updated based on the elapsed time since its last update and its fill rate. As determined in process block 424, if the packet conforms with the aggregate token bucket (e.g., it has enough tokens for the size of the packet), then in process block 426, the aggregate token buckets is updated based on the length of the packet; and in process block 428, the packet is marked as conforming and/or the conforming action is applied to the packet; and processing returns to process block 402. Otherwise, in process block 430, the packet is marked as exceeding and/or the exceeding action is applied to the packet; and processing returns to process block 402.

Figure 5A:
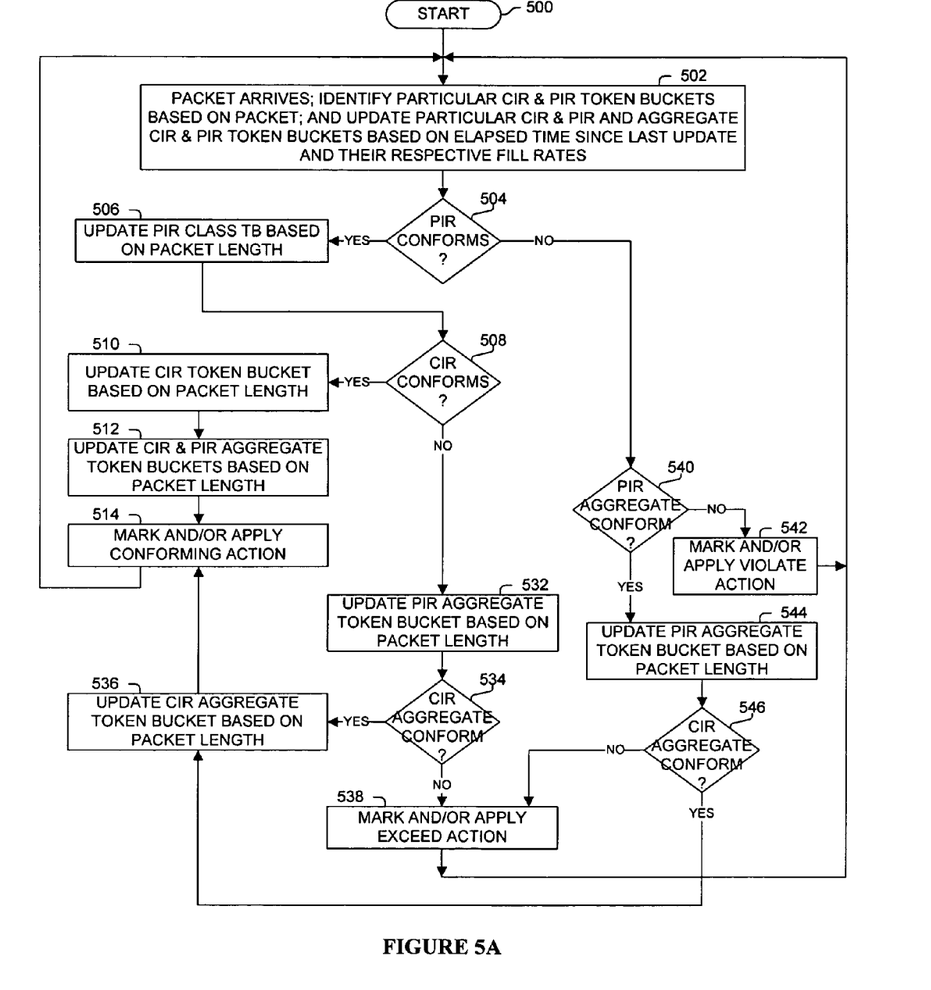
FIG. 5A is flow diagram illustrating a process used in one embodiment using one or more multilevel coupled policers.
Figure 5B:
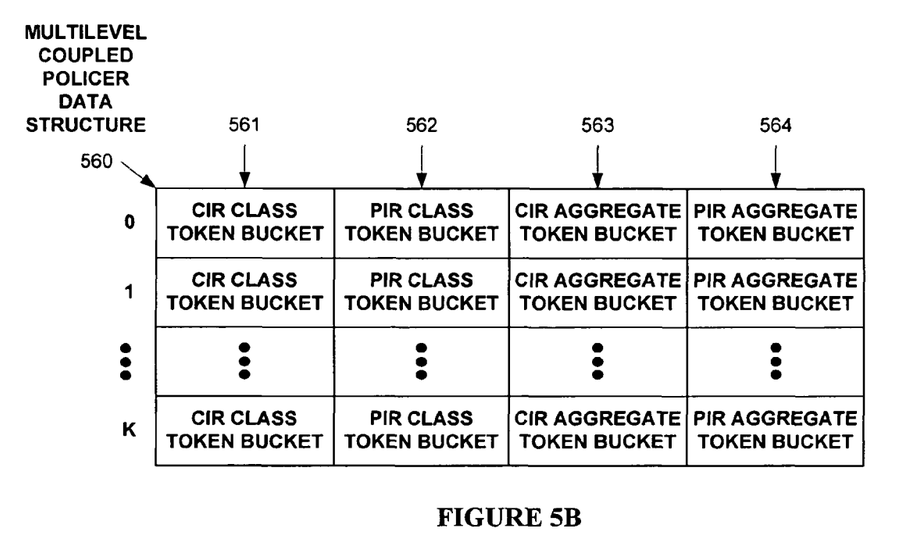
FIG. 5B is a data structure used in one embodiment.

FIG. 5A illustrates a process used in one embodiment using one or more multilevel coupled policers, and FIG. 5B illustrates a data structure 560 used in one embodiment. Note, these FIGS. illustrate that a policer may determine that a packet is conforming, exceeding, or violating. One embodiment in identifying these characterizations uses multiple token buckets, such as, but not limited to, a committed information rate (CIR) token bucket and a peak information rate (PIR) token bucket. One embodiment also allows for selective borrowing of tokens/bandwidth from the aggregate policer, such as that illustrated by process blocks 412 and 420 of FIG. 4A.

As shown in FIG. 5B, multilevel coupled policer data structure 560 includes for each of K classifications, the number of tokens currently in the CIR class token bucket 561, the number of tokens currently in the PIR class token bucket 562, the number of tokens currently in the CIR aggregate token bucket 563, and the number of tokens currently in the PIR aggregate token bucket 564.

Processing of FIG. 5A begins with process block 500, and proceeds to process block 502, wherein a packet arrives; the particular CIR and PIR class and aggregate token buckets (e.g., the class and aggregate policers) to use for the packet are identified and are updated based on the elapsed time since their last fill update and their respective fill rates. As determined in process block 504, if the packet conforms with the PIR class token bucket, then in process block 506, the PIR class token bucket (TB) is updated based on the length of the packet. As determined in process block 508, if the packet conforms to the CIR class token bucket, then in process blocks 510 & 512, the CIR class token bucket, the CIR aggregate token bucket, and the PIR aggregate token bucket are updated based on the packet length; in process block 514, the packet is marked as conforming and/or the conforming action is applied to the packet; and processing returns to process block 502.

Otherwise, as determined in process block 508, the packet does not conform to the CIR class token bucket, then in process block 532, the PIR aggregate token bucket is update based on the packet length and as determined in process block 534, if the packet conforms with the CIR aggregate token bucket, then in process block 536, the CIR aggregate token bucket is also updated based on the packet length; and in process block 514, the packet is marked as conforming and/or the conforming action is applied to the packet; and processing returns to process block 502. (Note, in one embodiment, if the packet conforms with the CIR aggregate token bucket as determined in process block 534, then the packet-size amount of tokens is re-added to the class PIR token bucket before processing proceeds to process block 536.) Otherwise, as determined in process block 534, the packet does not conform with the CIR aggregate token bucket, and in process block 538, the packet is marked as exceeding and/or the exceeding action is applied to the packet; and processing returns to process block 502.

Otherwise, as determined in process block 504, the packet does not conform to the PIR class token bucket. As determined in process block 540, if the packet does not conform with the PIR aggregate token bucket, then in process block 542, the packet is marked as violating and/or the violating action is applied to the packet; and processing returns to process block 502. Otherwise, in process block 544, the PIR aggregate token bucket is updated based on the packet length. As determined in process block 546, if the packet conforms with the CIR aggregate token bucket, then in process block 536, the CIR aggregate token bucket is also updated based on the packet length; and in process block 514, the packet is marked as conforming and/or the conforming action is applied to the packet; and processing returns to process block 502. Otherwise, in process block 538, the packet is marked as exceeding and/or the exceeding action is applied to the packet; and processing returns to process block 502.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for policing packets using a multilevel coupled policer scheme including a first-level plurality of class policers and a second-level aggregate policer, with each of said policers associated with a token bucket, the multilevel coupled policer scheme configured to share bandwidth of the aggregate policer among packet traffic corresponding to the class policers based on said packet traffic, the method comprising:

selecting a particular class token bucket of said class token buckets based on a particular packet;

updating the number of tokens in the particular class token bucket based on the elapsed time since its last update and a corresponding token fill rate;

updating the number of tokens in an aggregate token bucket associated with the particular token bucket based on the elapsed time since its last update and a corresponding token fill rate;

in response to determining that the length of the packet conforms with the number of tokens in the particular class token bucket or in the aggregate token bucket: updating both the particular class token bucket and the aggregate token bucket based on the length of the packet, and marking or applying conforming action to the particular packet; and in response to determining that the length of the packet does not conform with the number of tokens in the particular class token bucket: in response to determining that the length of the packet does not conform with the number of tokens in the aggregate token bucket, marking or applying an exceeding action to the particular packet;

wherein said operation of the determination that the length of the packet conforms with the number of tokens in the particular class token bucket or in the aggregate token bucket includes: determining that the number of tokens in the particular class token bucket is not enough for the particular packet to conform, and determining that the number of tokens in the aggregate token bucket is enough for the particular packet to conform.

2. The method of claim 1, wherein said exceeding action includes dropping the particular packet.

3. The method of claim 1, wherein said conforming action includes forwarding the packet.

4. The method of claim 1, wherein said operation of in response to determining that the length of the packet conforms with the number of tokens in the particular class token bucket or in the aggregate token bucket: updating both the particular class token bucket and the aggregate token bucket based on the length of the packet, and marking or applying conforming action to the particular packet includes: determining that the number of tokens in the particular class token bucket is sufficient for the particular packet, and updating the aggregate token bucket to result in a negative number of tokens.

5. A multilevel coupled policer configured to police packets, the multilevel coupled policer including:

a first-level plurality of class policers, with each of said policers associated with a committed information rate (CIR) token bucket and a peak information rate (PIR) token bucket;

a second-level aggregate policer associated with a CIR aggregate token bucket and a PIR aggregate token bucket;

means for updating the number of tokens in a particular CIR class token bucket and in a particular PIR token bucket corresponding to an arrived particular packet based on the elapsed time since their respective last update and based on their respective token fill rate;

means for updating the number of tokens in said CIR aggregate token bucket and said PIR aggregate token bucket based on the elapsed time since their respective last update and based on their respective token fill rate;

means for updating the number of tokens in the particular PIR class token bucket, in the particular CIR class token bucket, in said CIR aggregate token bucket, and in said PIR aggregate token bucket based on the packet length and for marking or applying conforming action to the particular packet when the length of the packet conforms with the number of tokens in the particular PIR class token bucket and in the particular CIR class token bucket; and means for classifying the packet as conforming, for marking or applying conforming action to the particular packet, and for updating the number of tokens in said CIR aggregate token bucket and said PIR aggregate token bucket based on the length of the packet, when the particular packet has been determined to not to be conforming based on the particular PIR class token bucket or the particular CIR class token bucket, but the particular packet has been determined to be conforming based on the CIR aggregate token bucket.

6. The multilevel coupled policer of claim 5, including means for identifying the particular packet as violating and for marking or applying violating action to the particular packet when the length of the packet does not conform with the number of tokens in the particular PIR class token bucket nor with the number of tokens in the PIR aggregate token bucket.

7. The multilevel coupled policer of claim 6, including means for identifying the particular packet as exceeding and for marking or applying exceeding action to the particular packet when the length of the packet does not conform with the number of tokens in the particular PIR class token bucket, the length of the packet does conform with the number of tokens in the PIR aggregate token bucket, and the length of the packet does not conform with the number of tokens in the CIR aggregate token bucket; and means for updating the number of tokens in said PIR aggregate token bucket based on the length of the packet.

8. The multilevel coupled policer of claim 7, wherein the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket.

9. The multilevel coupled policer of claim 6, wherein the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket; and means for updating the number of tokens in said PIR aggregate token bucket based on the length of the packet.

10. The multilevel coupled policer of claim 5, including means for identifying the particular packet as exceeding and for marking or applying exceeding action to the particular packet when the length of the packet does not conform with the number of tokens in the particular PIR class token bucket, the length of the packet does conform with the number of tokens in the PIR aggregate token bucket, and the length of the packet does not conform with the number of tokens in the CIR aggregate token bucket; and means for updating the number of tokens in said PIR aggregate token bucket based on the length of the packet.

11. The multilevel coupled policer of claim 10, wherein the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket.

12. The multilevel coupled policer of claim 5, wherein the multilevel coupled policer is also configured to identify the particular packet as exceeding and for marking or applying exceeding action to the particular packet when the length of the packet does conform with the number of tokens in the particular PIR class token bucket, the length of the packet does not conform with the number of tokens in the particular CIR class token bucket, and the length of the packet does not conform with the number of tokens in the CIR aggregate token bucket; and wherein the multilevel coupled policer includes: means for updating the number of tokens in said PIR aggregate token bucket based on the length of the packet.

* * * * *